Feb. 22, 1955 A. EASTON 2,702,837

MULTISTAGE BROAD BAND SIGNAL-TRANSLATING SYSTEM

Filed Aug. 6, 1949

INVENTOR.
ALLAN EASTON

BY Laurence B. Dodds

ATTORNEY

United States Patent Office 2,702,837

Patented Feb. 22, 1955

2,702,837

MULTISTAGE BROAD BAND SIGNAL-TRANSLATING SYSTEM

Allan Easton, Roslyn Heights, N. Y., assignor to Hazeltine Research, Inc., Chicago, Ill., a corporation of Illinois Application August 6, 1949, Serial No. 108,982

5 Claims. (Cl. 179—171)

*Introduction*

The present invention relates generally to multistage broad band signal-translating systems having power characteristics which vary in a predetermined sense with frequency for translating signals. Such a multistage signal-translating system may be advantageously incorporated into any signal-translating system in which a higher power output is desirable from a circuit having a given power rating. While not limited thereto, a multistage broad band signal-translating system in accordance with the invention is particularly suited for use in a television video-frequency amplifier circuit effectively to obtain a higher power output from a circuit of a given power rating, and will be described in such an environment.

In accordance with present-day television practice, a transmitted television signal comprises a carrier-wave signal modulated during recurrent periods with video-frequency and steady-state components representative of light variations in an image being viewed and control signals for maintaining the transmitter and receiver systems in synchronism. A carrier wave modulated by audio-frequency signals also is transmitted adjacent to the above-mentioned wave modulated by video-frequency signals within the same wide radio-frequency band. This complex radio-frequency wave is intercepted by a television receiver wherein the various modulation signals of the radio-frequency waves are detected and utilized in the audio-frequency and video-frequency circuits.

One of the essential functions that must be performed by a television receiver is the high-fidelity translation and amplification of the video-frequency signals. At the present time, signals occupying a band width of approximately 4 megacycles are amplified in the intermediate-frequency amplifier and the video-frequency amplifier. To facilitate such amplification in the intermediate-frequency amplifier stages, it is common practice to employ what are known as stagger-tuned circuits. No similar circuit technique is employed in the wide band, resistor-condenser coupled amplifiers of the video-frequency stages. In such stages it is common practice to attempt to obtain an output circuit having a characteristic such that uniform output power response is obtained over the described wide frequency band. This is accomplished by making provisions for high signal gain in the voltage amplifier stages and accepting low-efficiency operation in the power output stage. This type of video-frequency amplifier is highly inefficient, unnecessarily large and much too costly for the results obtained.

It is an object of this invention, therefore, to provide a multistage broad band signal-translating system which avoids one or more of the above-mentioned limitations of prior systems.

It is another object of the invention to provide an improved multistage broad band signal-translating system in which the power characteristics of the system vary in a predetermined sense with frequency.

It is a specific object of the invention to provide an improved and efficient multistage broad band signal-translating system for translating video-frequency signals in which the power characteristics of the system vary in a predetermined sense with frequency and to provide an amplifier for those signals producing a high-power output for a given power rating.

*Statement of invention*

In accordance with a particular form of the invention, a multistage broad band signal-translating system for use in television apparatus comprises a circuit for supplying a video-frequency signal having an amplitude-frequency characteristic and a substantially consistent nonuniform distribution of power over the band of frequencies of the signal. The signal-translating system includes a first amplifier for translating the video-frequency signal including a load network responsive to the signal and having resistive and reactive circuit elements so proportioned that the magnitude of the impedance thereof and the gain of the amplifier vary with frequency substantially inversely as the aforesaid distribution of power. The signal-translating system also includes another amplifier responsive to the translated video-frequency signal and including a load network responsive thereto having resistive and reactive circuit elements so proportioned that the magnitude of the impedance thereof and the gain of the other amplifier vary with frequency substantially directly as the aforesaid distribution of power for developing in the load network of the other amplifier a video-frequency signal having substantially the same amplitude-frequency characteristic as the supplied signal, whereby the over-all response of the amplifiers is maintained substantially uniform over the band of frequencies and the power-handling capacity of the other amplifier is increased.

For a better understanding of the present invention, together with other and further objects thereof, reference is had to the following description taken in connection with the accompanying drawing, and its scope will be pointed out in the appended claims.

*Drawing, General*

In the drawing, Fig. 1 is a circuit diagram, partly schematic, of a television receiver including a video-frequency amplifier in accordance with a particular form of the present invention; and Fig. 2 is a graph useful in explaining the operation of the video-frequency amplifier stages utilized in the Fig. 1 receiver.

*General description of embodiment of Fig. 1*

Referring now more particularly to Fig. 1 of the drawing, the television receiver there represented is of the superheterodyne type and has an antenna system 10, 11 coupled to a radio-frequency amplifier 12 of one or more stages. There is coupled to the latter unit, in cascade and in the order named, an oscillator-modulator 13, an intermediate-frequency amplifier 14 of one or more stages and a sound-reproducing system 15 having a frequency detector stage and one or more amplifier stages. There also is coupled to the intermediate-frequency amplifier 14, in cascade and in the order named, a detector 16, synchronizing circuits 17 and an image reproducer 18. There is coupled between the detector 16 and the image reproducer 18 a video-frequency amplifier 19. The units 12–19, inclusive, with the exception of the video-frequency amplifier 19, which is constructed in accordance with the present invention and will presently be described in detail, may be of conventional construction and operation so that a detailed description and explanation of the operation thereof are unnecessary herein.

*General explanation of operation of embodiment of Fig. 1*

Considering briefly, however, the general operation of the above-described receiver as a whole, television signals intercepted by the antenna system 10, 11 are selected and amplified in the radio-frequency amplifier 12 and are supplied to the oscillator-modulator 13, wherein they are converted to intermediate-frequency signals. The latter, in turn, are selectively amplified in the intermediate-frequency amplifier 14 and are translated to the sound-reproducing system 15 and the detector 16. The audio-frequency modulation components of the signal are derived, amplified and utilized in the sound reproducer 15. The video-frequency modulation components of the signal are derived by the detector 16 and are supplied to the synchronizing circuits 17 and the video-frequency amplifier 19. Synchronizing circuits 17 separate the synchronizing-signal components from the video-frequency components and supply the synchronizing signals to the image reproducer 18. Video-frequency amplifier 19 amplifies the video-frequency components and supplies them to the brilliancy-control electrode of image reproducer 18 to modulate the intensity of the electron beam thereof in accordance with the intensity of the video-frequency components.

*Detailed description of circuit embodying invention*

Figures 1, 2:
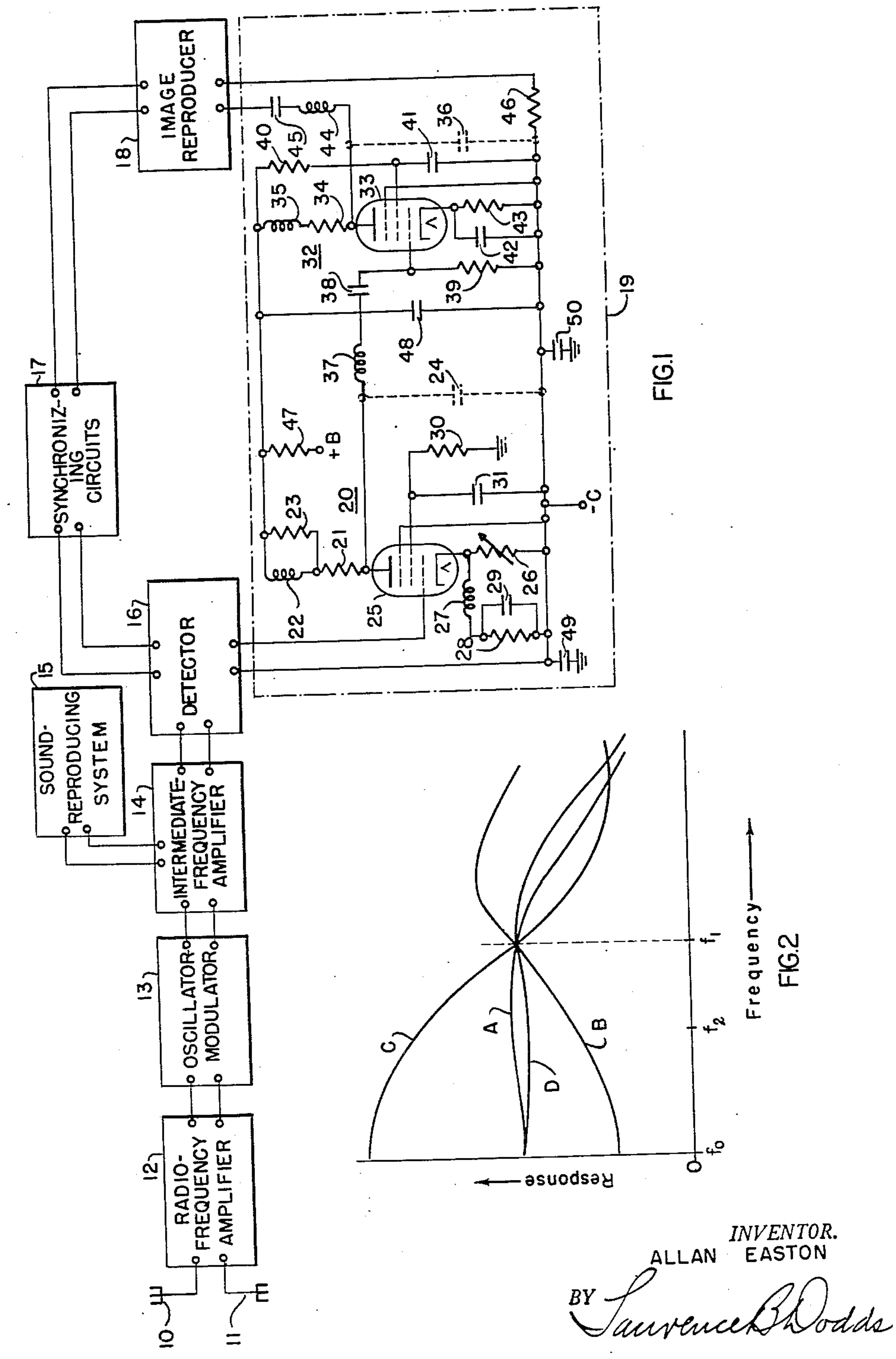

Referring now more particularly to the portion of the receiver embodying the present invention, the video-frequency amplifier 19 comprises a multistage broad band signal-translating system having power output characteristics which vary in a predetermined sense with frequency for translating signals. This system includes a circuit for supplying a video-frequency signal having an amplitude-frequency characteristic and a substantially consistent non-uniform distribution of power over the band of frequencies of the signal, specifically, the output circuit of the detector 16. The signal-translating system also includes a first repeater stage 20 having an impedance network so proportioned as to produce a variation in the signal response of this stage in one sense with frequency. The stage 20 includes an electron tube 25, preferably of the high-impedance type, having a signal-input electrode thereof connected to the output circuit of the detector 16. The cathode of tube 25 is connected through a variable resistor 26 to a source of potential —C. In parallel with the resistor 26 are a choke coil 27 serially connected with a parallel network of a resistor 28 and a condenser 29. The suppressor electrode of tube 25 is also connected to the source of potential —C. The screen electrode of this tube is connected through a resistor 30 to ground and is by-passed to the —C potential source through a condenser 31. A network comprising a resistor 21 and a parallel-connected choke coil 22 and resistor 23 connected in series with resistor 21 is connected between the anode of tube 25 and a source of potential +B through a resistor 47. A condenser 24, represented in broken-line construction since it may be comprised in whole or in part of the distributed capacitance of the anode-cathode circuit of tube 25 or other inherent capacitances associated therewith, is connected in parallel with the circuit comprising resistors 21, 23 and choke coil 22. The parallel circuit is completed through condensers conventionally inserted parallel to the sources of potential +B and —C. The parallel-resonant circuit comprising the resistors 21 and 23, the choke coil 22 and the condenser 24 comprises a first broad band filter network in the anode circuit of tube 25. The impedance of this network is proportioned to produce a variation in the signal response of stage 20 in one sense with frequency. Specifically, the network is proportioned to have at low frequencies an effective shunt impedance of $$\frac{1}{K}$$

times the value of an impedance proportioned to produce a substantially uniform response over the pass band of stage 20, where K is a constant of a value greater than unity.

The multistage broad band signal-translating system also comprises a second repeater stage 32, which is coupled to the first repeater stage 20 and includes an impedance network so proportioned as to produce a variation in the signal response of the second stage opposite to that of the first stage, in particular reciprocal to the response of the first stage. The stage 32 includes an electron tube 33, preferably of the high-impedance type, having a signal-input electrode coupled to the anode circuit of the repeater stage 20 through a choke coil 37 and a condenser 38. Choke coil 37 is proportioned to compensate for the effect of the interelectrode capacitance between the signal-input electrode and the cathode of tube 33. A resistor 39 is connected between the signal-input electrode of tube 33 and a source of potential —C. The suppressor electrode of tube 33 is connected to the source of potential —C. The screen electrode of tube 33 is connected through a resistor 40 to the source of potential +B and is also connected to the source of potential —C through a by-pass condenser 41. A network comprising a parallel-connected condenser 42 and a resistor 43 is connected between the cathode of tube 33 and the source of potential —C. A network comprising a resistor 34 and a choke coil 35 is connected in series between the anode of tube 33 and the source of potential +B through the resistor 47. A condenser 36, represented in broken-line construction since it may be comprised in whole or in part of the distributed capacitance of the anode-cathode circuit of the tube 33 or other inherent capacitance associated therewith, is connected in parallel with the circuit comprising resistor 34 and choke coil 35. The parallel circuit is completed through condensers conventionally inserted parallel to the sources of potential +B and —C. The parallel-resonant circuit of resistor 34 and choke 35 with condenser 36 parallel thereto comprises a second broad band filter network in the anode circuit of tube 33. The impedance of this network is proportioned to produce a variation in the signal response of stage 32 opposite to the variation in signal response of the stage 20. Specifically, the network is proportioned to have at low frequencies an effective shunt impedance of K times the value of an impedance proportioned to produce a substantially uniform response over the pass band of stage 32, where K is a constant of a value greater than unity.

The output circuit of the second repeater stage 32 is connected through a choke coil 44 and a condenser 45, to one terminal, and a resistor 46, to the other terminal, to the input circuit of the image reproducer 18. The resistor 47 and a condenser 48 are provided in the video-frequency amplifier to maintain some degree of voltage regulation and thereby to reduce flicker from the output of repeater stage 32. Condensers 49 and 50 connected between the source of potential —C and ground act as isolation and by-pass condensers.

As has been heretofore described, the first parallel-resonant circuit comprising the resistor 21, the choke coil 22, the resistor 23 and the condenser 24 is proportioned to have an effective shunt impedance at low frequencies across the anode-cathode circuit of the tube 25 of $$\frac{1}{K}$$

times the value of anode circuit load impedance producing a substantially uniform response over the pass band of the resonant circuit, K being a constant having a value greater than unity. The second parallel-resonant circuit comprising the resistor 34, the choke coil 35 and the condenser 36 is proportioned to have at low frequencies an effective shunt resistance of a value K times the value of a load resistance which would be proportioned to produce a substantially uniform response over the pass band of the second resonant circuit. In some circuits it may only be necessary that the resistor 21 have a value of $$\frac{1}{K}$$

and that the resistor 34 have a value of K times a normal value for these resistors. In a particular embodiment of the invention, it has been determined that K may have a value of 2 to effect the desired result.

*Theory of operation of circuit embodying invention*

Before discussing the operation of the multistage broad band signal-translating system represented by the unit 19 of Fig. 1 and the results obtained thereby, it may be helpful at this time to discuss the theory behind the proportioning of the parallel-resonant circuits in the anode circuits of tubes 25 and 33 in the manner heretofore described.

A Fourier analysis of the wave forms of the conventional type of broad band video-frequency signal indicates that, while the voltage of a signal wave may have a peak magnitude of a certain amount, no one of the spectral components of the signal wave may be that large. In fact, the higher the frequency of the components of the signal wave, the smaller the magnitude of the voltage of the component. The signal-frequency components near 4 megacycles in a band of video-frequency signals have amplitudes which are a small percentage of the peak magnitude voltage of the signal wave. Therefore, it is not necessary, and in fact it is undesirable, for the output or power amplifier stage of a video amplifier system to deliver equal power throughout the entire frequency spectrum. Most of the signal energy is concentrated at the low and middle portions of the frequency band, between the frequencies $f_0$ and $f_2$ designated in Fig. 2, and very little energy is ordinarily found near the upper portion of the frequency band, between frequencies $f_2$ and $f_1$ of Fig. 2. Though the higher frequency but lower energy signal components may require equal amplification with the lower frequency but higher energy components in order to maintain fidelity, the higher frequency components do not require as large voltage variations in the power output tube anode circuit. Therefore, an amplifier which has uniform signal-response characteristics, but decreasing power-handling capacity with frequency, will produce a satisfactory picture in the image reproducer. By utilizing this principle, an output tube anode load impedance of at least twice the size of that normally employed may be used, thereby effecting approximately twice the power gain.

*Operation of circuit embodying invention*

The operation of the video-frequency amplifier 19 embodying the present invention and the results obtained thereby, may be best understood by reference to Fig. 2 of the drawing. Televison signals occupying the frequency band $f_0$—$f_1$ are applied to the signal-input electrode of vacuum tube 25. It is assumed that the television signals between the frequencies $f_0$ and $f_1$ have been translated through circuits having the equivalent of uniform response characteristics. Amplified television signals will be developed in the anode load circuit consisting of resistor 21, choke coil 22, resistor 23 and condenser 24 of tube 25. As previously mentioned, the shunt impedance of this load circuit is so proportioned as to produce a variation in the signal response of the stage in one sense with frequency. When it is proportioned to have a resistance value of $$\frac{1}{K}$$

times the value of a resistor proportioned to produce a substantially uniform response over the pass band of this stage, then the frequency response is nonuniform as represented by curve B having relatively small low-frequency response with increased high-frequency response between frequencies $f_2$ and $f_1$. Thus, the sense of the response of stage 20 is upward with increasing frequency. The television signals present in the anode circuit of the stage 20 of Fig. 1 are applied through choke coil 37 and coupling condenser 38 to the signal-input electrode of tube 33. Since this tube is the power output tube of the video-frequency amplifier, it is desired that an exceptionally high-power output be obtained from this stage without affecting the over-all fidelity of the video-frequency amplifier 19. The power amplified television signal is developed in the anode load circuit including resistor 34, choke coil 35 and condenser 36 of tube 33. In order to increase the power obtainable from this stage, as previously mentioned, the shunt impedance of the anode load circuit is proportioned to have a value greater than the value of a conventional filter. Specifically, in one embodiment of the present invention, resistor 34 is proportioned to have a value twice the normal value, thereby effecting approximately twice the power obtainable in the normal output stage. The frequency-response characteristic of stage 32, when a resistor 34 of twice normal value is employed, is represented by curve C, indicating a response characteristic having variations opposite to those produced in stage 20, having relatively high low-frequency response with decreasing high-frequency response between frequencies $f_0$ and $f_1$. Though stages 20 and 32 both have nonuniform frequency-response characteristics, as represented by curves B and C of Fig. 2, the responses of these two stages are so proportioned that their combined frequency-response characteristic will be that represented by curve D of Fig. 2, thereby effecting approximately uniform signal response though increased power has been obtained from power stage 32. A comparison of curve A, which represents the frequency-response characteristic for a conventional video-frequency amplifier, with curve D of Fig. 2 indicates that the frequency-response characteristic of a video-frequency amplifier constructed in accordance with the teachings of the invention disclosed herein is essentially as uniform as that of a conventional video-frequency amplifier. It therefore becomes evident that by means of the novel arrangement described above, the overall response of a multistage broad band signal-translating system may be maintained substantially uniform over the broad band of frequencies while the power-handling capacity of the system is increased in that portion of the frequency band where maximum delivered power is required.

*Values of circuit elements*

While applicant does not wish to be limited to any particular circuit values for the embodiment of the invention described above, there follows a set of representative values which may be utilized in the broad band signal-translating system as represented by the video-frequency amplifier of Fig. 1:

| | |
|---|---|
| Tube **25** | Type 6AU6. |
| Tube **33** | Type 6AK6. |
| Choke coil **22** | 235 microhenries. |
| Choke coil **35** | 130 microhenries. |
| Choke coil **37** | 150 microhenries. |
| Condenser **24** | Approximately 12 micromicrofarads. |
| Condenser **36** | Approximately 12 micromicrofarads. |
| Condenser **38** | 0.1 microfarad. |
| Resistor **21** | 1,800 ohms. |
| Resistor **23** | 3,900 ohms. |
| Resistor **34** | 6,800 ohms. |
| Resistor **47** | 4,700 ohms. |
| +B | +190 volts. |
| —C | —140 volts. |

The remainder of the circuit elements have values which would be normal for Class A amplifiers.

Though the foregoing description has been directed to an embodiment of the present invention which employs only two stages of amplification, it will be readily understood that the teachings of the invention are not limited to such use but may be employed with any broad band signal-translating system in which a higher power output over a portion of the frequency band is desired from a circuit having a given power rating.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A multistage broad band signal-translating system for television apparatus comprising: a circuit for supplying a video-frequency signal having an amplitude-frequency characteristic and a substantially consistent nonuniform distribution of power over the band of frequencies of said signal; a first amplifier for translating said video-frequency signal including a load network responsive to said signal and having resistive and reactive circuit elements so proportioned that the magnitude of the impedance thereof and the gain of said amplifier vary with frequency substantially inversely as said distribution of power; and another amplifier responsive to said translated video-frequency signal and including a load network responsive thereto having resistive and reactive circuit elements so proportioned that the magnitude of the impedance thereof and the gain of said other amplifier vary with frequency substantially directly as said distribution of power for developing in said load network of said other amplifier a video-frequency signal having substantially the same amplitude-frequency characteristic as said supplied signal, whereby the over-all response of said amplifiers is maintained substantially uniform over said band of frequencies and the power-handling capacity of said other amplifier is increased.

2. A multistage broad band signal-translating system for television apparatus comprising: a circuit for supplying a video-frequency signal having an amplitude-frequency characteristic and a substantially consistent nonuniform distribution of power over the band of frequencies of said signal; a first amplifier for translating said video-frequency signal including an anode load network responsive to said signal and having resistance and inductance in series so proportioned that the magnitude of the impedance thereof and the gain of said amplifier vary with frequency substantially inversely as said distribution of power; and another amplifier responsive to said translated video-frequency signal and including an anode load network responsive thereto having resistance and inductance in series so proportioned that the magnitude of the impedance thereof and the gain of said other amplifier vary with frequency substantially directly as said distribution of power for developing in said load network of said other amplifier a video-frequency signal having substantially the same amplitude-frequency characteristic as said supplied signal, whereby the over-all response of said amplifiers is maintained substantially uniform over said band of frequencies and the power-handling capacity of said other amplifier is increased.

3. A multistage broad band signal-translating system for television apparatus comprising: a circuit for supplying a video-frequency signal having an amplitude-frequency characteristic and a substantially consistent non-uniform distribution of power over the band of frequencies of said signal; a first amplifier for translating said video-frequency signal including a load network responsive to said signal and having resistive and reactive circuit elements so proportioned that the magnitude of the impedance thereof and the gain of said amplifier increase as the frequency of said signal increases; and another amplifier responsive to said translated video-frequency signal and including a load network responsive thereto having resistive and reactive circuit elements so proportioned that the magnitude of the impedance thereof and the gain of said other amplifier decrease as the frequency of said translated video-frequency signal increases so as to vary with frequent substantially directly as said distribution of power for developing in said load network of said other amplifier a video-frequency signal having substantially the same amplitude-frequency characteristic as said supplied signal, whereby the over-all response of said amplifiers is maintained substantially uniform over said band of frequencies and the power-handling capacity of said other amplifier is increased.

4. A multistage broad band signal-translating system for television apparatus comprising: a circuit for supplying a video-frequency signal having an amplitude-frequency characteristic and a substantially consistent non-uniform distribution of power over the band of frequencies of said signal; a first amplifier for translating said video-frequency signal including an anode load network responsive to said signal and having resistive and reactive circuit elements with an effective resistance of 1/K times the value of an effective resistance which would cause said first amplifier to have a substantially uniform response over the range of frequencies of said video-frequency signal, K being a constant of value greater than unity so that the gain of said amplifier varies with frequency substantially inversely as said distribution of power; and another amplifier responsive to said translated video-frequency signal and including an anode load network responsive thereto having resistive and reactive circuit elements with an effective resistance of K times the value of an effective resistance which would cause said other amplifier to have a substantially uniform response over the range of frequencies of said video-frequency signal, so that the gain of said other amplifier varies with frequency substantially directly as said distribution of power for developing in said load network of said other amplifier a video-frequency signal having substantially the same amplitude-frequency characteristic as said supplied signal, whereby the over-all response of said amplifiers is maintained substantially uniform over said band of frequencies and the power-handling capacity of said other amplifier is increased.

5. A multistage broad band signal-translating system for television apparatus comprising: a circuit for supplying a video-frequency signal having an amplitude-frequency characteristic and a substantially consistent non-uniform distribution of power over the band of frequencies of said signal; a first amplifier for translating said video-frequency signal including an anode load network responsive to said signal and having resistive and reactive circuit elements with an effective resistance of one-half that which would cause said first amplifier to have substantially uniform gain so that the gain of said amplifier varies with frequency substantially inversely as said distribution of power; and another amplifier responsive to said translated video-frequency signal and including an anode load network responsive thereto having resistive and reactive circuit elements with an effective resistance of twice the value of that which would cause said other amplifier to have substantially uniform gain so that the gain of said other amplifier varies with frequency substantially directly as said distribution of power for developing in said load network of said other amplifier a video-frequency signal having substantially the same amplitude-frequency characteristic as said supplied signal, whereby the over-all response of said amplifiers is maintained substantially uniform over said band of frequencies and the power-handling capacity of said other amplifier is increased.

References Cited in the file of this patent

UNITED STATES PATENTS

| | | |
|---|---|---|
| 1,963,198 | Gannett | June 19, 1934 |
| 1,992,063 | Forstmann | Feb. 19, 1935 |
| 2,022,514 | MacDonald | Nov. 26, 1935 |
| 2,155,467 | Braden | Apr. 25, 1939 |
| 2,378,797 | Schade | June 19, 1945 |